US012335183B2

(12) United States Patent
Yan et al.

(10) Patent No.: US 12,335,183 B2
(45) Date of Patent: *Jun. 17, 2025

(54) METHOD AND APPARATUS FOR MPDCCH PERFORMANCE ENHANCEMENT

(71) Applicant: LENOVO (BEIJING) LIMITED, Beijing (CN)

(72) Inventors: Zhi Yan, Beijing (CN); Hongmei Liu, Beijing (CN); Haipeng Lei, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 48 days.

This patent is subject to a terminal disclaimer.

(21) Appl. No.: 18/074,892

(22) Filed: Dec. 5, 2022

(65) Prior Publication Data
US 2023/0095135 A1    Mar. 30, 2023

Related U.S. Application Data (63) Continuation of application No. 17/258,793, filed as application No. PCT/CN2018/096486 on Jul. 20, 2018, now Pat. No. 11,546,109.

(51) Int. Cl.
*H04L 5/00* (2006.01)
*H04W 4/70* (2018.01)
*H04W 72/23* (2023.01)
*H04W 72/044* (2023.01)

(52) U.S. Cl.
CPC .............. *H04L 5/0048* (2013.01); *H04W 4/70* (2018.02); *H04W 72/23* (2023.01); *H04W 72/044* (2013.01)

(58) Field of Classification Search
CPC ........ H04L 5/0048; H04W 4/70; H04W 72/23
See application file for complete search history.

(56) References Cited

U.S. PATENT DOCUMENTS

2016/0100395 A1    4/2016  Xu et al.
2016/0127097 A1    5/2016  Chen et al.
2016/0381490 A1*  12/2016  Alvarino ................. H04W 4/70

FOREIGN PATENT DOCUMENTS

WO        2014113938 A1    7/2014

OTHER PUBLICATIONS

Ericsson, "M-PDCCH link performance for MTC", R1-155031, 3GPP TSG RAN WG1 Meeting #82bis, Oct. 5-9, 2015, pp. 1-6.

(Continued)

*Primary Examiner* — Ronald B Abelson
(74) *Attorney, Agent, or Firm* — Kunzler Bean & Adamson (57) ABSTRACT

The present application relates to a method and apparatus for MPDCCH performance enhancement. One embodiment of the present disclosure provides an apparatus comprising: a receiver that receives a first reference signal, a second reference signal and a control signal; and a processer that decodes the control signal based on at least one of: the first reference signal and the second reference signal, wherein the second reference signal on an antenna port is associated with a precoder, and the antenna port of the second reference signal and the precoder for the antenna port of the second reference signal are adopted within a time duration and a frequency band.

21 Claims, 4 Drawing Sheets

(56) References Cited

OTHER PUBLICATIONS

LG Electronics, "Downlink control channel related issues for MTC", R1-150199, 3GPP TSG RAN WG1 Meeting #80, Feb. 9-13, 2015, pp. 1-9.
Nokia, "MPDCCH performance improvement", R1-1808435, Nokia, Nokia Shanghai Bell, 3GPP TSG RAN WG1 Meeting #94, Aug. 20-24, 2018, pp. 1-2.
Qualcomm, "Physical Downlink Control Channels", R1-153846, Qualcomm Incorporated, 3GPP TSG RAN WG1 #82, Aug. 24-28, 2015, pp. 1-8.
PCT/CN2018/096486, "International Search Report and the Written Opinion of the International Search Authority" ISA/CN, National Intellectual Property Administration, Office of the PRC China, Mar. 20, 2019, pp. 1-7.

* cited by examiner

METHOD AND APPARATUS FOR MPDCCH PERFORMANCE ENHANCEMENT

TECHNICAL FIELD

The present application generally relates to a communication method and apparatus, especially a communication method and apparatus for Machine-Type Communication (MTC) physical downlink control channel (MPDCCH) performance enhancement.

BACKGROUND OF THE INVENTION

In Rel.13, the Demodulation Reference Signal (DMRS) is used for decoding MTC Physical Downlink Control Channel (MPDCCH), while the Cell-Specific Reference Signal (CRS) is not.

For Rel.13, the demodulation of MPDCCH is based on DMRS as Enhanced Physical Downlink Control Channel (EPDCCH). In order to enhance the performance of MPDCCH, combining DMRS with CRS is proposed to be considered in Rel.16

In order to improve the performance of MPDCCH, an approach for combining DMRS with CRS for MPDCCH demodulation is desired.

BRIEF SUMMARY OF THE INVENTION

One embodiment of the present disclosure provides an apparatus comprising: a receiver that receives a first reference signal, a second reference signal and a control signal; and a processer that decodes the control signal based on at least one of: the first reference signal and the second reference signal, wherein the second reference signal on an antenna port is associated with a precoder, and the antenna port of the second reference signal and the precoder for the antenna port of the second reference signal are adopted within a time duration and a frequency band.

Another embodiment of the present disclosure provides an apparatus comprising: a transmitter that transmits a first reference signal, a second reference signal and a control signal; and a processer that pre-processes the second reference signal on an antenna port using a precoder, wherein the antenna port of the second reference signal and the precoder for the antenna port of the second reference signal are adopted within a time duration and a frequency band.

Yet another embodiment of the present disclosure provides a method comprising: receiving a first reference signal, a second reference signal and a control signal; and decoding the control signal based on at least one of: the first reference signal and the second reference signal, wherein the second reference signal on an antenna port is associated with a precoder, and the antenna port of the second reference signal and the precoder for the antenna port of the second reference signal are adopted within a time duration and a frequency band.

Yet another embodiment of the present disclosure provides a method comprising: transmitting a first reference signal, a second reference signal and a control signal; and pre-processing the second reference signal on an antenna port using a precoder, wherein the antenna port of the second reference signal and the precoder for the antenna port of the second reference signal are adopted within a time duration and a frequency band.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide the method and apparatus for MPDCCH performance enhancement. To facilitate understanding, embodiments are provided under specific network architecture and new service scenarios, such as 3GPP 5G, 3GPP LTE Release 8 and onwards. Persons skilled in the art know well that, with developments of network architecture and new service scenarios, the embodiments in the subject disclosure are also applicable to similar technical problems.

Figure 1:
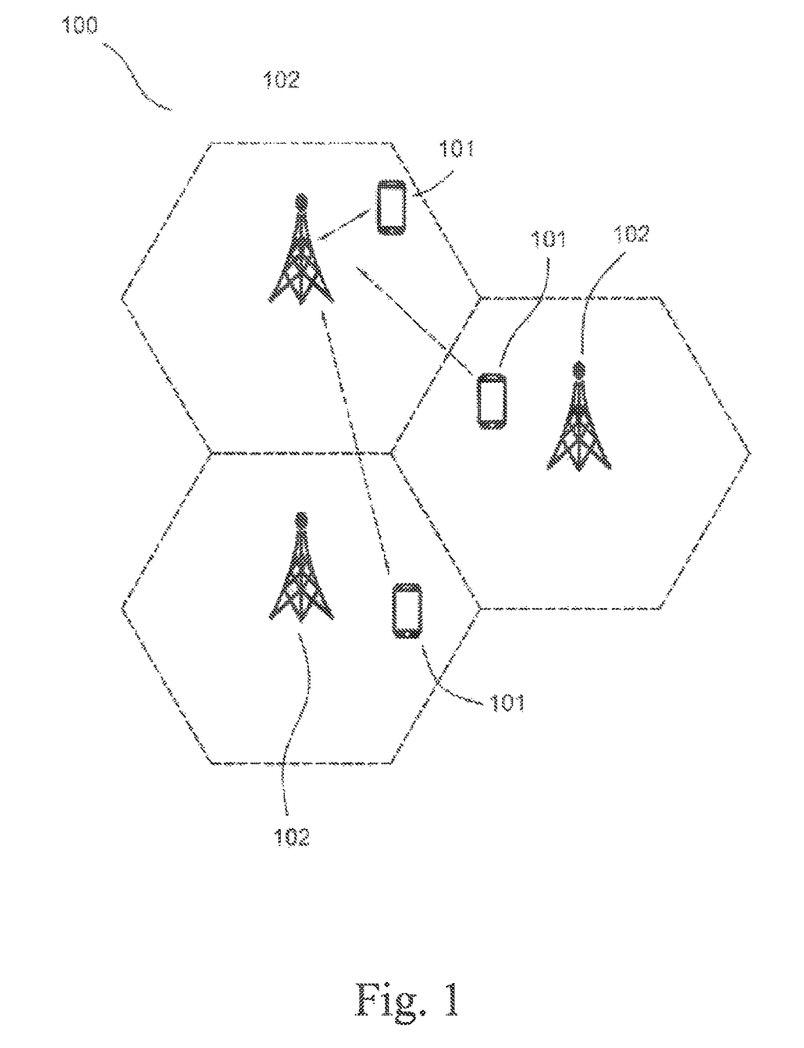
FIG. 1 illustrates an example block diagram of a wireless communication system according to an embodiment of the present disclosure.

FIG. 1 depicts a wireless communication system 100 according to an embodiment of the present disclosure.

As shown in FIG. 1, the wireless communication system 100 includes user equipment 101 and base units 102. Even though a specific number of user equipment 101 and base units 102 are depicted in FIG. 1, one of skill in the art will recognize that any number of user equipment 101 and base units 102 may be included in the wireless communication system 100.

The user equipment 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the user equipment 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the user equipment 101 includes wearable devices, such as smart watches, fitness bands, optical head-mounted displays, or the like. Moreover, the user equipment 101 may be referred to as subscriber units, mobiles, mobile stations, users, terminals, mobile terminals, wireless terminals, fixed terminals, subscriber stations, user equipment 101, user terminals, a device, or by other terminology used in the art. The user equipment 101 may communicate directly with a base unit 102 via uplink (UL) communication signals.

The base units 102 may be distributed over a geographic region. In certain embodiments, a base unit 102 may also be referred to as an access point, an access terminal, a base, a base station, a macro cell, a Node-B, an enhanced Node B (eNB), a base units 102, a Home Node-B, a relay node, a device, or by any other terminology used in the art. The base units 102 are generally part of a radio access network that may include one or more controllers communicably coupled to one or more corresponding base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with the long-term evolution (LTE) of the 3GPP protocol, wherein the base unit 102 transmits using an orthogonal frequency division multiplexing (OFDM) modulation scheme on the DL and the user equipment 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in some embodiments the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with user equipment 101 using the 3GPP 5G protocols.

The subject application presents an approach for MPDCCH performance enhancement. The base station pre-processes the DMRS of an antenna port and MPDCCH based on a precoder, and transmits the CRS, pre-processed DMRS and MPDCCH to UE. After receiving these signals, UE decodes the MPDCCH based on the CRS and pre-processed DMRS. The antenna port of DMRS and the precoder is adopted within a time duration and a frequency band.

The precoder indicates a relationship between the CRS antenna port and DMRS antenna port since the CRS is not pre-processed with the precoder. By combining CRS and DMRS with precoders at the UE side, an improved channel estimation can be achieved Thus, for enhancing the joint DMRS-CRS channel estimation, at least the following items should be determined at the UE side: a frequency band, a time duration and an antenna port for transmitting the MPDCCH, and a precoder associated with the time duration, the frequency band and the antenna port. These items may be indicated by higher layer signalling, implicitly derived from higher layer signaling configured parameters or fixed in specification.

Figure 2:
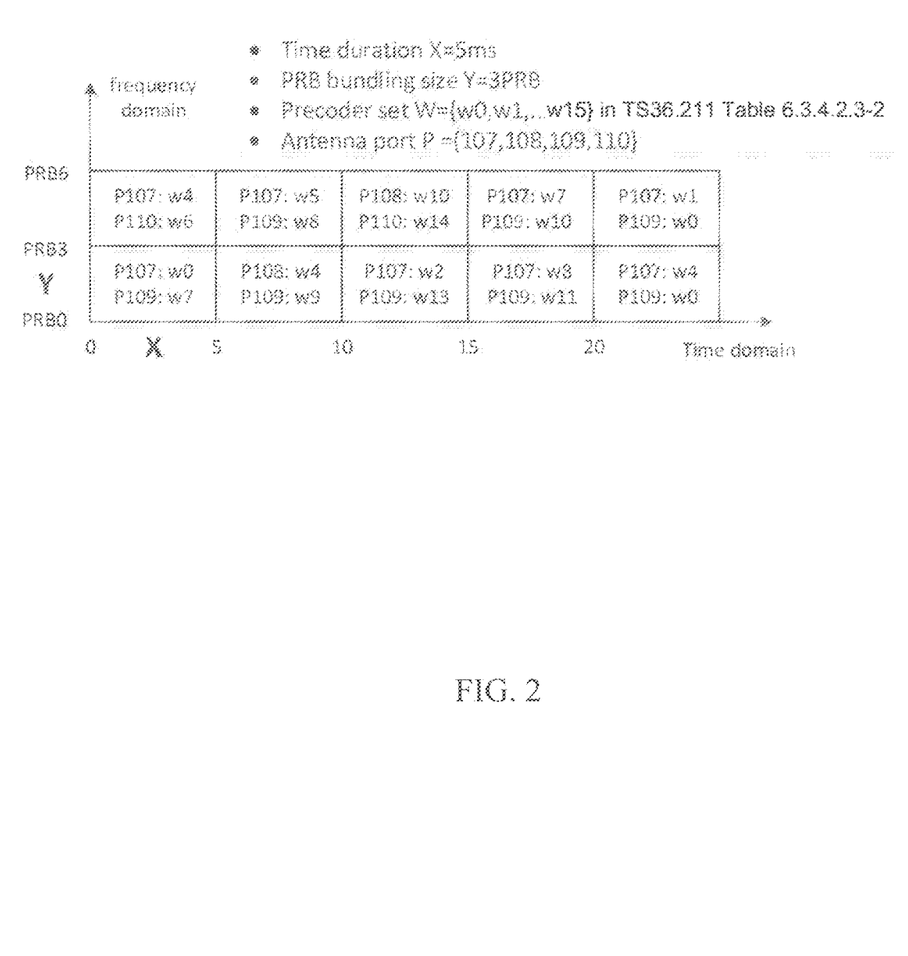
FIG. 2 illustrates an example of joint DMRS-CRS channel estimation.

FIG. 2 depicts a precoder arrangement in time-frequency domain for joint DMRS-CRS channel estimation. In this embodiment, higher layer signalling indicates an antenna port of DMRS and a precoder for the antenna port of DMRS within a time duration and a frequency band.

As shown in FIG. 2, the horizontal axis represents the time domain, and the vertical axis represents the frequency domain. The length of time duration, which is denoted by "X," is 5 ms, the size of frequency band, which is denoted by "Y," is 3 Physical Resource Block(PRB), the precoder set is denoted as W={w0, w1, . . . w15}, and the antenna port set is denoted as P={P107, P108, P109, and P110}. The precoder set W adopted for DMRS and MPDCCH may be determined by the total available antenna port number of CRS. For example, if the available antenna port number of CRS is 2, the precoder set in Table 6.3.4.2.3-1 of Evolved Universal Terrestrial Radio Access (E-UTRA); Physical channels and modulation (3GPP TS36.211) is utilized, where the element of each precoder is a 2×1 complex vector, and if the available port number of CRS is 4, the precoder set in Table 6.3.4.2.3-2 of 3GPP TS36.211 is utilized, where the element of each precoder is a 4×1 complex vector. In FIG. 2, the precoder set W is selected from Table 6.3.4.2.3-2 of 3GPP TS36.211.

As shown in FIG. 2, the higher layer signalling indicates that in time duration from 0 to 5 and frequency band from PRB0 to PRB2, the antenna port P107 associated with precoder w0 are adopted by DMRS and the MPDCCH, the other antenna port P109 associated with precoder w7 are adopted by DMRS and the MPDCCH; and the in time duration from 10 to 15 and frequency band from PRB3 to PRB5, and the antenna port P108 associated with the precoder w10 are adopted by DMRS and the MPDCCH or antenna port 110 is associated with precoder w14 are adopted by DMRS and MPDCCH. For example, w0 w7, w10 and w14 are selected from the second column in Table 6.3.4.2.3-2 of 3GPP TS36.211, where the second column suggests the number of layers is 2.

In other embodiments, the preocoder set W may also be determined by higher layer signaling or fixed in specification.

Figure 3:
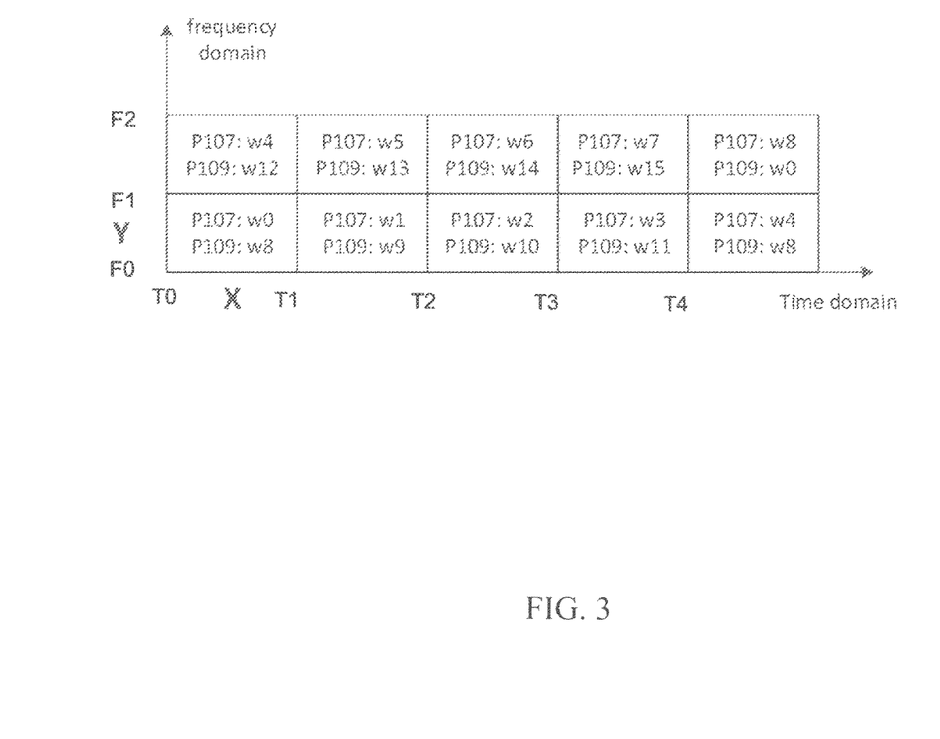
FIG. 3 illustrates another example of joint DMRS-CRS channel estimation.

FIG. 3 depicts another example of precoder arrangement in time-frequency domain for joint DMRS-CRS channel estimation.

The length of time duration X may be derived from the existing higher layer parameters, or fixed in the specification rather than indicated by the higher layer signaling as shown in FIG. 2. As shown in FIG. 3, the length of time duration X may be from T0 to T1 or from T1 to T2 For example, T0 may be 0, T1 may be 5 ms, and T2 may be 10 ms.

In one preferred embodiment, the length of time duration X can be determined by the MPDCCH search space of Rmax, which is a maximal repetition number of the MPDCCH. For example, the value of X may be floor (Rmax/N), where floor ( ) is the lower rounding function, and N is the total number of precoders in the precoder set. Assuming that higher layer signalling configures Rmax is 128 and N is 16 (CRS antenna port is 0, 1, 2, or 3), the length of time duration is X=128/16=8.

In another preferred embodiment, the length of time duration X may be determined by Coverage Enhancement (CE) mode of MPDCCH and duplex mode of Frequency Division Duplex (FDD) and Time Division Duplex (TDD). For example, as shown in Table 1, if the CE mode is A and the duplex mode is FDD, the length of time duration X may be 1, 2, 4, or 8 and higher layer signalling indicates the X from {1, 2, 4, 8}; if the CE mode is B and the duplex mode is TDD, the length of time duration X may be 5, 10, 20, or 40 and higher layer signalling indicates the X from {5, 10, 20, 40}.

TABLE 1

| the value of the length of time duration X | | |
|---|---|---|
| CE Mode | FDD | TDD |
| A | 1, 2, 4, or 8 | 1, 5, 10, or 20 |
| B | 2, 4, 8, or 16 | 5, 10, 20, or 40 |

In yet another preferred embodiment, the length of time duration X may also be determined by a scaling factor configured by higher layer signaling and/or interval-DL-HoppingCofigCommonodeA/B-r13. If the scaling factor is 1 and the configured interval-DLNHoppiingConfigCommon-modeA/B-r13 is 5 ms by higher layer signalling, the length of time duration is interval-DLHoppingConfigCommonModeA/B-r13 multiplied by the scaling factor, which is 5 ms×1=5 ms. For example, for FDD, the scaling factor indicated by higher layer signalling from a scaling factor set, for example the scaling factor set can be {1, 2, 4, 8}.

In another preferred embodiment, the length of time duration X may also be determined by the antenna port number of the DMRS or a cyclic prefix type.

The size of frequency band Y (i.e., the PRB bundling size) can be indicated by the higher layer signaling, derived from the existing higher layer parameters, or fixed in the specification. The size of frequency band Y may be from F0 to F1, or from F1 to F2. For example, F0 may be 0, F1 may be 180×3 KHz (corresponding to frequency domain size of 3PRB) and F2 may be 180×6 KHz (corresponding to frequency domain size of 6PRB).

For example, in table 2, the value of the PRB bundling size can be "P1," "P2," "Q1," "Q2," "R1," or "R2," which are determined by higher layer signaling.

TABLE 2

| the value of the PRB bundling size Y | | |
|---|---|---|
| | Localized MPDCCH | |
| numberPRB-Pairs | CE mode A | CE mode B |
| 2 | P1 | P2 |
| 4 | Q1 | Q2 |
| 6 | R1 | R2 |

In another preferred embodiment, the PRB bundling size is determined by the number of available PRB pairs (i.e., numberPRB-Pairs), CE Mode, and transmission type of MPDCCCH (i.e., localized or distributed). For example, if the number of available PRB pairs configured by higher layer signalling is 2, the transmission type of MPDCCH is configured as localized transmission mode, and the CE mode is A, it is determined that the value of the PRB bundling size is 1 according to Table 3.

TABLE 3

| the value of the PRB bundling size Y | | | | |
|---|---|---|---|---|
| numberPRB-Pairs | Localized MPDCCH | | Distributed MPDCCH | |
| | CE mode A | CE mode B | CE mode A | CE mode B |
| 2 | 1 | 2 | 1 | 2 |
| 4 | 2 | 4 | 2 | 4 |
| 6 | 3 | 6 | 3 | 6 |

The starting subframe for adoption of the antenna port of DMRS and the precoder for the antenna port of DMRS may be determined according to a starting subframe of a search space of MPDCCH, an absolute radio frame, or an absolute subframe.

The starting subframe may also be determined by the search space of MPDCCH. For common search space, the starting subframe is cell-specific, and The starting subframe for adoption of the antenna port of DMRS and the precoder for the antenna port of DMRS is the same as the starting subframe of the common search space.

For example, if the starting subframe is cell-specific, the starting subframe is related to the absolute subframe (e.g., determined by System Frame Number (SFN) and subframe number).

The starting precoder index for adoption of the antenna port of DMRS may relates to the cell ID, and the circular order is determined by circular selection from the precoder set. For example, for time domain, the precoder index is determined by the following equation:

$$j=(j+M1)\% N;$$

where j is the index of precoder set, M1 is the step size configured by higher layer signalling or fixed in specification, N is the number of precoder in the precoder set.

For UE-specific search space, the starting subframe of precoder adoption is UE-specific. For example, the starting subframe of precoder adoption may begin with the starting subframe of UE-specific search space, and the starting precoder index relates to the UE ID.

The antenna port of DMRS may be circularly selected from an antenna port set P{P107, P108, P109, P110}. For example, it can be selected from the antenna port set P according to at least one of: the time duration X, the frequency band Y, and the antenna port of DMRS.

The precoder for the antenna port of DMRS may be circularly selected from a precoder set W {w0, w1, . . . , w15} For example, it can be selected from the precoder set W according to at least one of: the time duration X, the frequency band Y, and the antenna port of DMRS.

The initial precoder index of the precoder for the antenna port of DMRS may be determined according to the cell ID or the UE ID. For example, in time duration from 0 to 5 and frequency band from PRB0 to PRB2, for antenna port P107, the initial precoder index is cell ID % N, and for antenna port P109, the initial precoder index is: (cell ID+M1) % N, where M1 may be fixed to 4 or higher layer signalling configured, and N is the total number precoder in the precoder set.

The antenna port of DMRS may be circularly selected from an antenna port set according to the time duration or the frequency band, and an initial antenna port of DMRS may be determined according to a cell ID or UE ID. The circular order may be configured by higher layer signaling or fixed in the specification.

Take the embodiment in FIG. 3 as an example. For the same frequency band (e.g, F0 to F1) and the same antenna port (e.g, P107), the index of precoder in different time duration is:

$$(\text{cell } ID+M2)\% N$$

where M2 is the time step, N is the total number of precoder set. In this case, in time domain from T0 to T1, the precoder index is 0; in time domain from T1 to T2, the precoder index is: (0+1) % 16=1; in the time domain from T2 to T3, the precoder index is (0+2) %16=2. That is, for the same frequency band (e.g, from F0 to F1) and the same antenna port (e.g., P107), the precoder is w0 in the time duration from T0 to T1; the precoder is w1 in the time duration from T1 to T2; and the precoder is w2 in the time duration from T2 to T3.

In another preferred embodiment, the base unit may transmit a configuration to the UE, and the configuration may include a precoder set W, a size of the frequency band Y, a length of the time duration X, a starting frequency band, an offset of the frequency band, a starting time duration, an offset of the time duration, an initial antenna port, an initial precoder index, an antenna port adoption order pattern, or a step index of the precoder.

Figure 4:
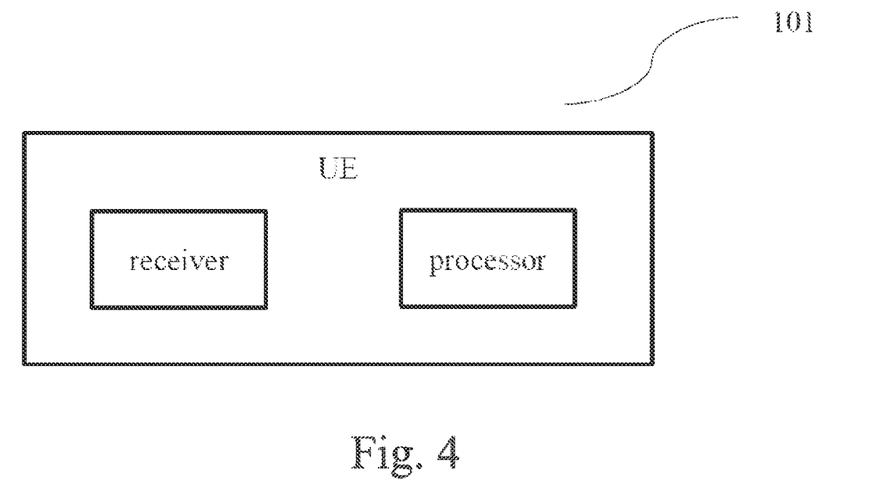
FIG. 4 illustrates an example block diagram of user equipment according to an embodiment of the present disclosure.

FIG. 4 depicts a block diagram of user equipment according to the embodiments of the present disclosure. The user equipment 101 may include a receiver and a processor. In certain embodiments, the user equipment 101 may further include an input device, a display, a memory, and/or other elements. In one embodiment, the receiver receives CRS, DMRS and MPDCCH, and the processor decodes MPDCCH based on at least one of: CRS, DMRS, wherein DMRS transmitted on an antenna port is associated with a precoder, and the antenna port of DMRS and the precoder for the antenna port of DMRS are adopted within a time duration and a frequency band. The functions and implementations of all elements in the user equipment 101 and definitions of related technical terms can refer to the specific descriptions of FIGS. 2 and 3 and the foregoing corresponding paragraphs in this specification.

Figure 5:
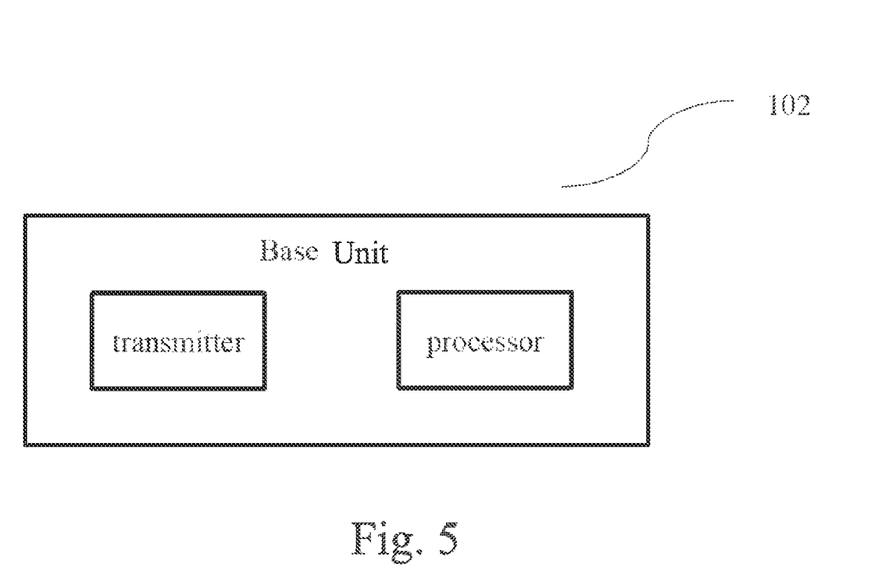
FIG. 5 illustrates an example block diagram of a base unit according to an embodiment of the present disclosure.

FIG. 5 depicts a block diagram of a base unit according to the embodiments of the present disclosure. The base unit 102 may include a transmitter and a processor. In certain embodiments, the base unit 102 may further include an input device, a display, a memory, and/or other elements. In one embodiment, a transmitter transmits CRS, DMRS and MPDCCH, and the processor pre-processes the DMRS using a precoder, and the antenna port of DMRS and the precoder for the antenna port of DMRS are adopted within a time duration and a frequency band. The functions and implementations of all elements in the apparatus and definitions of related technical terms can refer to the specific descriptions of FIGS. 2 and 3 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus, comprising
a memory; and
a processor coupled to the memory, the processor configured to cause the apparatus to:
receive a set of reference signals; and
receive a downlink control channel based at least in part on the received set of reference signals,
wherein an antenna port associated with a reference signal of the received set of reference signals is associated with a precoder of a set of precoders,
wherein the antenna port and the precoder are based at least in part on a time duration and a frequency band; and
wherein the precoder is based at least in part on the antenna port, the time duration, or the frequency band, or a combination thereof.

2. The apparatus of claim 1, wherein the set of reference signals comprises one or more reference signals, and wherein the one or more reference signals comprises a cell-specific reference signal, a demodulation reference signal, or a combination thereof.

3. The apparatus of claim 1, wherein the downlink control channel comprises a machine-type communication (MTC) physical downlink control channel (MPDCCH) and wherein the processor is further configured to cause the apparatus to:
decode the MPDCCH based at least in part on the received set of reference signals.

4. The apparatus of claim 1, wherein the processor is further configured to cause the apparatus to:
receive an indication of the antenna port associated with the reference signal, or the precoder associated with the reference signal, or both, via higher layer signaling.

5. The apparatus of claim 1, wherein the set of precoders is based at least in part on a total number of antenna ports.

6. The apparatus of claim 1, wherein the processor is further configured to cause the apparatus to:
determine the antenna port, the precoder, or both, based at least in part on an absolute subframe value.

7. The apparatus of claim 1, wherein the processor is further configured to cause the apparatus to:
select the precoder from the set of precoders based at least in part on an order associated with the set of precoders.

8. The apparatus of claim 7, wherein the order comprises a circular order.

9. An apparatus, comprising
a memory; and
a processor coupled to the memory, the processor configured to cause the apparatus to:
transmit a set of reference signals; and transmit a downlink control channel based at least in part on the transmitted set of reference signals,
wherein an antenna port associated with a reference signal of the set of reference signals is associated with a precoder of a set of precoders,
wherein the antenna port and the precoder are based at least in part on a time duration and a frequency band; and
wherein the precoder is based at least in part on the antenna port, the time duration, or the frequency band, or a combination thereof.

10. The apparatus of claim 9, wherein the set of reference signals comprises one or more reference signals, and wherein the one or more reference signals comprises a cell-specific reference signal, a demodulation reference signal, or a combination thereof.

11. The apparatus of claim 9, wherein the downlink control channel comprises a machine-type communication (MTC) physical downlink control channel (MPDCCH).

12. The apparatus of claim 9, wherein the processor is further configured to cause the apparatus to:
transmit an indication of the antenna port associated with the reference signal, or the precoder associated with the reference signal, or both, via higher layer signaling.

13. The apparatus of claim 9, wherein the set of precoders is based at least in part on a total number of antenna ports.

14. The apparatus of claim 9, wherein the processor is further configured to cause the apparatus to:
determine the antenna port, the precoder, or both, based at least in part on an absolute subframe value.

15. The apparatus of claim 9, wherein the processor is further configured to cause the apparatus to:
select the precoder from the set of precoders based at least in part on an order associated with the set of precoder.

16. The apparatus of claim 15, wherein the order comprises a circular order.

17. A method comprising:
receiving a set of reference signals; and
receiving a downlink control channel based at least in part on the received set of reference signals,
wherein an antenna port associated with a reference signal of the received set of reference signals is associated with a precoder of a set of precoders,
wherein the antenna port and the precoder are based at least in part on a time duration and a frequency band; and
wherein the precoder is based at least in part on the antenna port, the time duration, or the frequency band, or a combination thereof.

18. The method of claim 17, wherein the set of reference signals comprises one or more reference signals, and wherein the one or more reference signals comprises a cell-specific reference signal, a demodulation reference signal, or a combination thereof.

19. The method of claim 17, wherein the downlink control channel comprises a machine-type communication (MTC) physical downlink control channel (MPDCCH) and wherein the method further comprises:
decoding the MPDCCH based at least in part on the received set of reference signals.

20. The method of claim 17, further comprising:
receiving an indication of the antenna port associated with the reference signal, or the precoder associated with the reference signal, or both, via higher layer signaling.

21. A method comprising:
transmitting a set of reference signals; and
transmitting a downlink control channel based at least in part on the transmitted set of reference signals,
wherein an antenna port associated with a reference signal of the set of reference signals is associated with a precoder of a set of precoders,
wherein the antenna port and the precoder are based at least in part on a time duration and a frequency band; and
wherein the precoder is based at least in part on the antenna port, the time duration, or the frequency band, or a combination thereof.

* * * * *